US012678353B2

(12) United States Patent
Cardona

(10) Patent No.: US 12,678,353 B2
(45) Date of Patent: Jul. 14, 2026

(54) THIN PROFILE RETRACTOR

(71) Applicant: Valeda Company, LLC, Oakland Park, FL (US)

(72) Inventor: Edgardo Cardona, Pompano Beach, FL (US)

(73) Assignee: Valeda Company, LLC, Oakland Park, FL (US)

( * ) Notice: Subject to any disclaimer, the term of this patent is extended or adjusted under 35 U.S.C. 154(b) by 359 days.

(21) Appl. No.: 18/522,997

(22) Filed: Nov. 29, 2023

(65) Prior Publication Data

US 2024/0173180 A1 May 30, 2024

Related U.S. Application Data

(60) Provisional application No. 63/428,679, filed on Nov. 29, 2022.

(51) Int. Cl.
*A61G 3/00* (2006.01)
*A61G 3/08* (2006.01)

(52) U.S. Cl.
CPC .................................. *A61G 3/0808* (2013.01)

(58) Field of Classification Search
CPC ........ A61G 3/0808; A61G 3/08; B60N 2/005; B60N 2/01508; B60N 2/245; B60N 3/06; B60N 7/0823; B60N 7/08; B60N 7/0807; B60N 3/073; B60N 7/0815; B60R 22/22; B60R 22/34; B60Y 2200/84

(Continued)

(56) References Cited

U.S. PATENT DOCUMENTS 6,406,230 B1 6/2002 Mason et al.
8,636,451 B2 * 1/2014 Yamashita ........... A61G 3/0808 410/23

(Continued)

FOREIGN PATENT DOCUMENTS

CA 3228854 A1 2/2023
JP 3933428 B2 6/2007

OTHER PUBLICATIONS

International Search Report, Search Strategy, and Written Opinion of the International Searching Authority for PCT/US2022/039960, Nov. 28, 2022, 15 pages, International Searching Authority for the European Patent Office.

*Primary Examiner* — Steven O Douglas
(74) *Attorney, Agent, or Firm* — Daniel Tallitsch; Tyler Schultz

(57) ABSTRACT

A thin profile retractor can be installed in a vehicle without the needing to cut large holes in the OEM floor. A plurality of retractors combined in a single housing may define a drop-in, in-floor system. The thickness of the system is approximately equal to or slightly thicker than the thickness of aftermarket flooring that is typically placed on top of the OEM flooring or vehicle frame, e.g., plywood. Only small holes need to be drilled into the OEM floor to secure the system to the frame. The retractor includes components and configurations that permit the thin profile and/or allow the retractor to perform better during accidents. The retractor includes a locking member biased by a spring to a locked position and the drum is isolated from the force of the spring. The retractor includes a friction spacer to separate the drum from the housing and to reduce friction.

20 Claims, 4 Drawing Sheets

(58) Field of Classification Search
USPC ................................................................ 410/7
See application file for complete search history.

(56) References Cited

U.S. PATENT DOCUMENTS

| | | | | |
|---|---|---|---|---|
| 9,701,278 | B2 * | 7/2017 | Lee ........................ | B60R 22/405 |
| 10,836,300 | B2 * | 11/2020 | Persson .................... | A61G 3/08 |
| 11,285,057 | B2 * | 3/2022 | Bruns ................... | B60P 7/0846 |
| 2014/0369778 | A1 | 12/2014 | Hermanson et al. | |
| 2020/0377054 | A1 | 12/2020 | Jessup | |
| 2023/0048271 | A1 | 2/2023 | Infantas et al. | |

* cited by examiner

THIN PROFILE RETRACTOR

CROSS-REFERENCE TO OTHER APPLICATIONS

This application claims priority to U.S. Provisional Patent Application No. 63/428,679, filed on Nov. 29, 2022, which is incorporated herein by reference.

TECHNICAL FIELD

The embodiments described and claimed herein relate generally to wheelchair tiedown and occupant restraint systems (WTORS) and components thereof, including but not limited to thin profile retractors and retractor components and configurations that permit a thinner profile. More particularly, some embodiments of the present inventions relate to improvements to thin profile retractors that reduce friction between internal components.

BACKGROUND OF THE INVENTION

Various wheelchair securement and wheelchair occupant restraint systems are known in the art that permit wheelchair users to secure their wheelchair and person during motor-vehicle transport. Those systems typically comprise bulky, heavy retractors that either protrude from the floor of a vehicle—and therefore present a tripping hazard for walking passengers or an obstacle for a wheelchair—or must be connected to a floor track after a wheelchair has entered the wheelchair securement area and removed prior to leaving the area.

Some in the wheelchair securement industry have attempted to solve the problem of bulky retractors by integrating the wheelchair securement system below the floor of a vehicle. Those in-floor systems, however, are bulky in and of themselves, which makes installation difficult in common wheelchair transport vehicles. Indeed, installing those known in-floor systems requires cutting large holes through the OEM floor of the vehicle. Aside from this being a laborious and time-consuming task, cutting large holes in the OEM floor obviously may negatively affect the structural integrity of the vehicle.

In that regard, most prior devices either sit significantly above floor level, where they must be removed to enable the wheelchair passenger to maneuver in the vehicle, or they extend significantly below the OEM vehicle floor, where large holes must be cut therethrough.

The "ONE" system by Q'Straint—see PCT Patent Application No. PCT/US22/39960, filed on Aug. 10, 2022 and entitled "Thin Profile Retractor Apparatus and Systems," and U.S. Patent Application No. 63/232,804, filed on Aug. 13, 2021 and entitled "Thin Profile Retractor Apparatus and Systems," both of which are incorporated herein by reference—solved many of these problems through its use of a thin profile retractor. The ONE system packages a retractor with a thickness of just roughly 1.1" by orienting the axis of the spool normal to the floor. The unique and condensed configuration of the ONE, however, introduces friction between the spool, locking mechanism, and housing that must be overcome to retract the webbing.

SUMMARY OF THE PRESENT EMBODIMENTS

Clearly, the prior art devices have limitations which the present embodiments overcome. Various improvements to the device disclosed in the "ONE" system patent applications are contemplated herein that solve those limitations, which embodiments comprise combinations of any one or more of the following features or other features described in the "ONE" system patent applications and elsewhere in this disclosure, many features of which not only enable a retractor apparatus and a system comprising those retractor apparatus to substantially fit between the upper plane of the OEM floor and the upper plane of an aftermarket floor (or only slightly there above, i.e., within about ¼" or ½"), but also reduce friction by isolating the retractor spool from both the housing and the locking mechanism.

Further forms, objects, features, aspects, benefits, advantages, and embodiments will become apparent from the detailed description and drawings provided herewith.

BRIEF DESCRIPTION OF DRAWINGS

These and other features, aspects, objects, and advantages of the embodiments described and claimed herein will become better understood upon consideration of the following detailed description, appended claims, and accompanying drawings.

Figure 1:
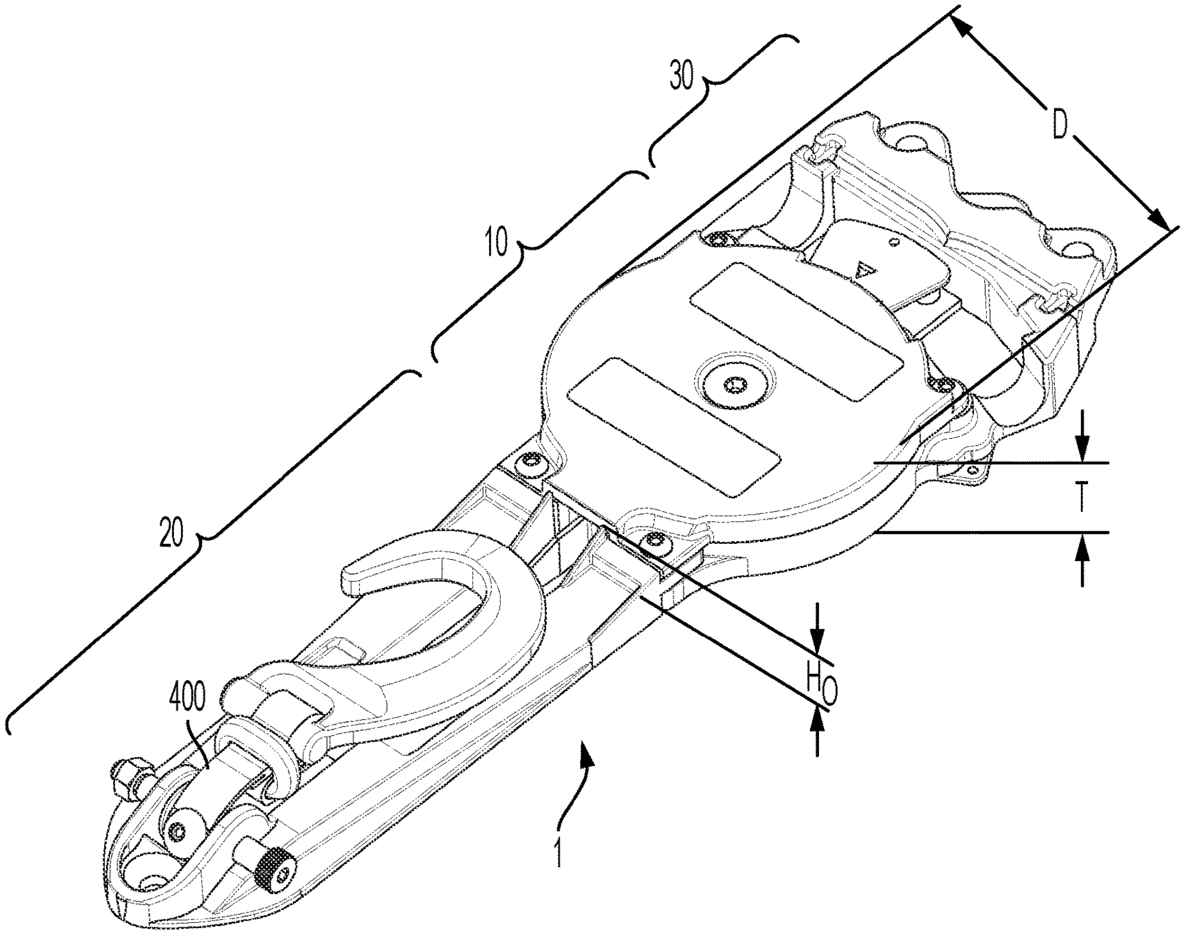
FIG. 1 is a perspective view of a first embodiment of an improved retractor module of the present inventions.
Figure 2:
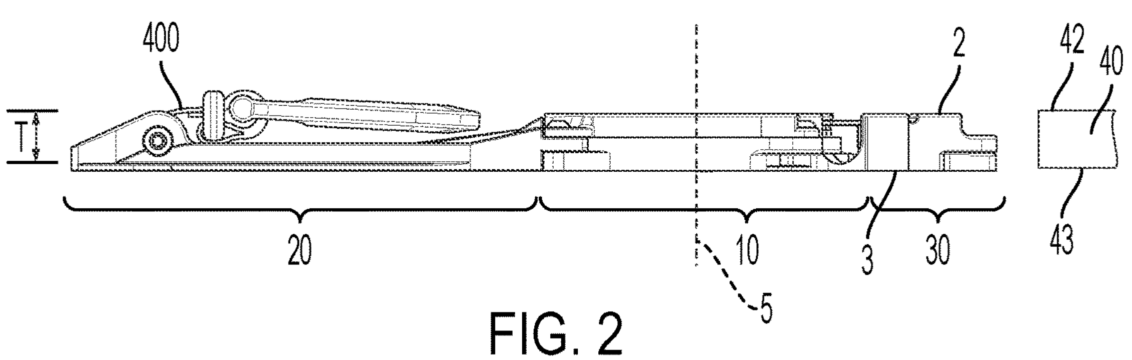
FIG. 2 is a side view of the retractor module.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE PRESENT EMBODIMENTS

For the purpose of promoting an understanding of the principles of the inventions, reference will now be made to the embodiments illustrated in the drawings and specific language will be used to describe the same. It will nevertheless be understood that no limitation of the scopes of the inventions is thereby intended. Any alterations and further modifications in the described embodiments and any further applications of the principles of the inventions as described herein are contemplated as would normally occur to one skilled in the art. Although a limited number of embodiments are shown and described, it will be apparent to those skilled in the art that some features that are not relevant to the claimed inventions may not be shown for the sake of clarity.

With reference first primarily to FIGS. 1-5, which reflect a first embodiment, an improved retractor may be assembled as a retractor module 1 suitable for incorporation into a wheelchair and wheelchair occupant (or other type cargo) securement system in a vehicle. The retractor module 1 comprises at least a retractor portion 10, and possibly one or both of a restraint guide portion 20 and a retractor actuator portion 30. The retractor module 1, or one or more portions 10, 20, 30 thereof, may be characterized as having a flat or "pancake" configuration, where the thickness T (measured along an axis parallel to the axis 5 of the retractor spool), which may generally correspond to the width WR of the restraint 400, is particularly small in comparison to prior art retractors used in the wheelchair securement industry. The thickness T of the shown embodiment is approximately 1.07 inches, although alternative embodiments may have a larger or smaller thickness T, for example less than or approximately equal to 2 inches, less than or approximately equal to 1½ inches, less than or approximately equal to 1¼ inches, less than or approximately equal to 1 inch, or less than or approximately equal to ¾ inch.

In comparison, prior art retractors in the wheelchair securement industry (such as the Q'Straint QRT series retractors) utilize restraints (of the webbing type) which alone have a width of 2 inches or more. Moreover, those prior art retractors place the mechanical components (e.g., ratchets, pawls, springs, etc.) to one or both sides of the restraint spool, which further increases the thickness of the prior art retractors.

As will be discussed in more detail below, a significantly reduced thickness T is achieved with the retractor module 1 by reducing the width $W_R$ of the restraint 400 as compared to the prior art and/or by placing mechanical components inside or at least partially inside the core of the retractor spool. Naturally, the diameter D of the retractor portion 10 may need to increase as compared to the prior art to accommodate increased restraint thickness (which may be required to achieve the necessary strength) and an enlarged spool core. Nonetheless, the retractor module 1 may be more dimensionally suitable for easy integration into, in front of, or behind various structures of a vehicle, such as a vehicle floor or walls. For instance, the thin profile of the retractor module 1 permits it to lay flat adjacent or inside such structures while taking up little space. In some applications, one or both of the upper surface 2 and/or lower surface 3 of the retractor module 1 (or other external housing for the retractor module 1, for example the housing 1100 described in the "ONE" system patent applications referenced above, which may be used with the retractor module 1 described herein) may sit flush (or approximately flush, i.e., within roughly ½ or ¼ inch, allowing wheeled mobility devices to roll over the retractor module 1) with one or both of the opposite faces 42, 43 of the structure 40 for a clean integrated look.

The flush or approximately flush arrangement (shown in FIG. 2) is particularly suitable in a vehicle utilizing aftermarket or add-on flooring (such as wood, plywood, composite wood or extruded aluminum—or similar or other material or construction—panels) that sit on top of the OEM vehicle floor. In this application, the thickness of the retractor module 1 may be less than or slightly greater than or approximately equal to (for example, within ½ or ¼ inch in compliance with the ADA and associated standards and regulations) the thickness of the add-on flooring, so that no large holes need to be cut in the OEM vehicle floor. Ideally, cutouts can be easily made in the add-on flooring which generally match the shape of the retractor module 1, and only a small, single hole will need to be drilled in the OEM vehicle to receive an anchor (e.g., nut and/or bolt) for the retractor module 1. In some applications, it may be desirable to also install a bracket below the vehicle floor to provide a solid anchoring location.

Figure 3:
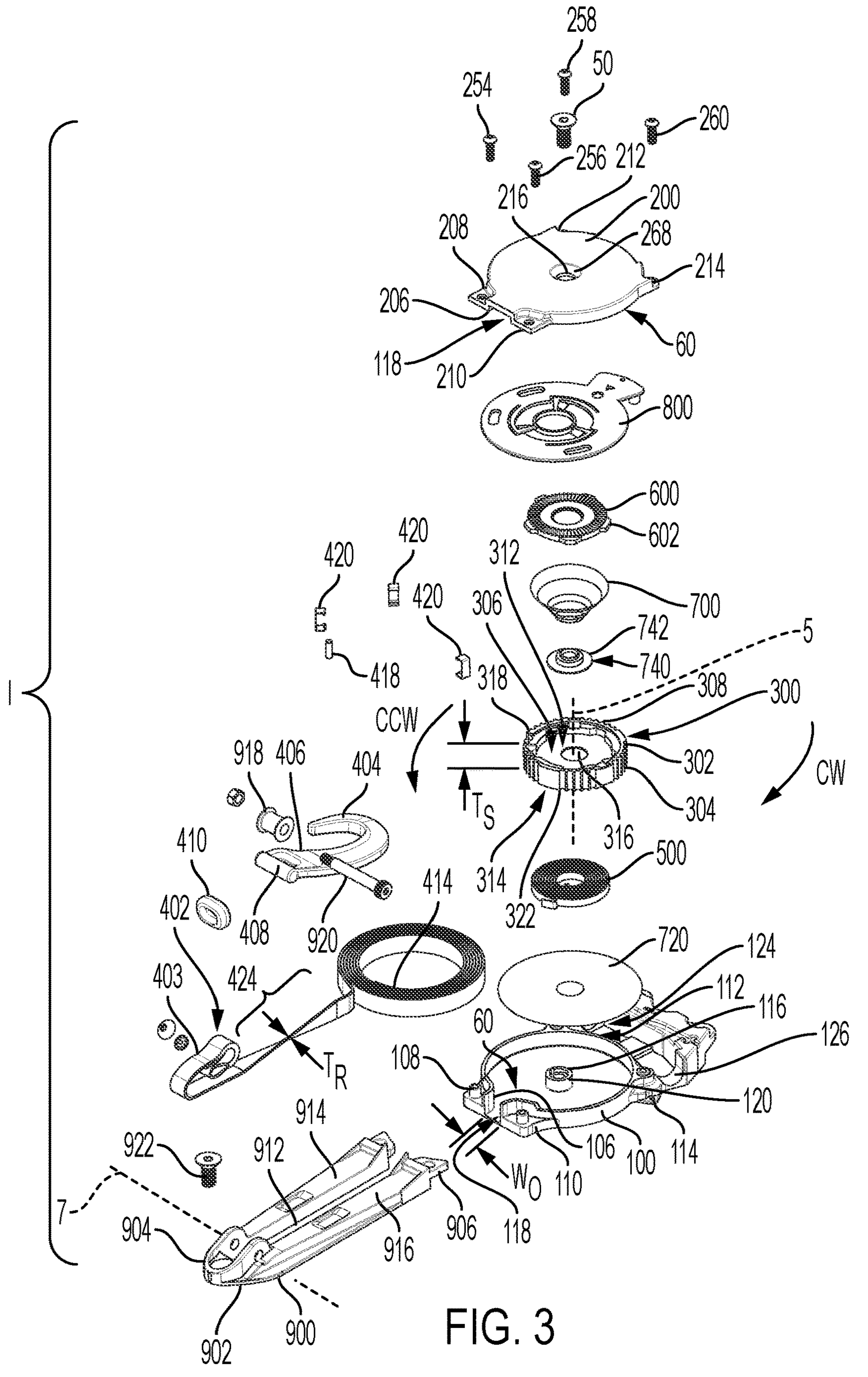
FIG. 3 is an exploded perspective view of the retractor module.
Figure 4:
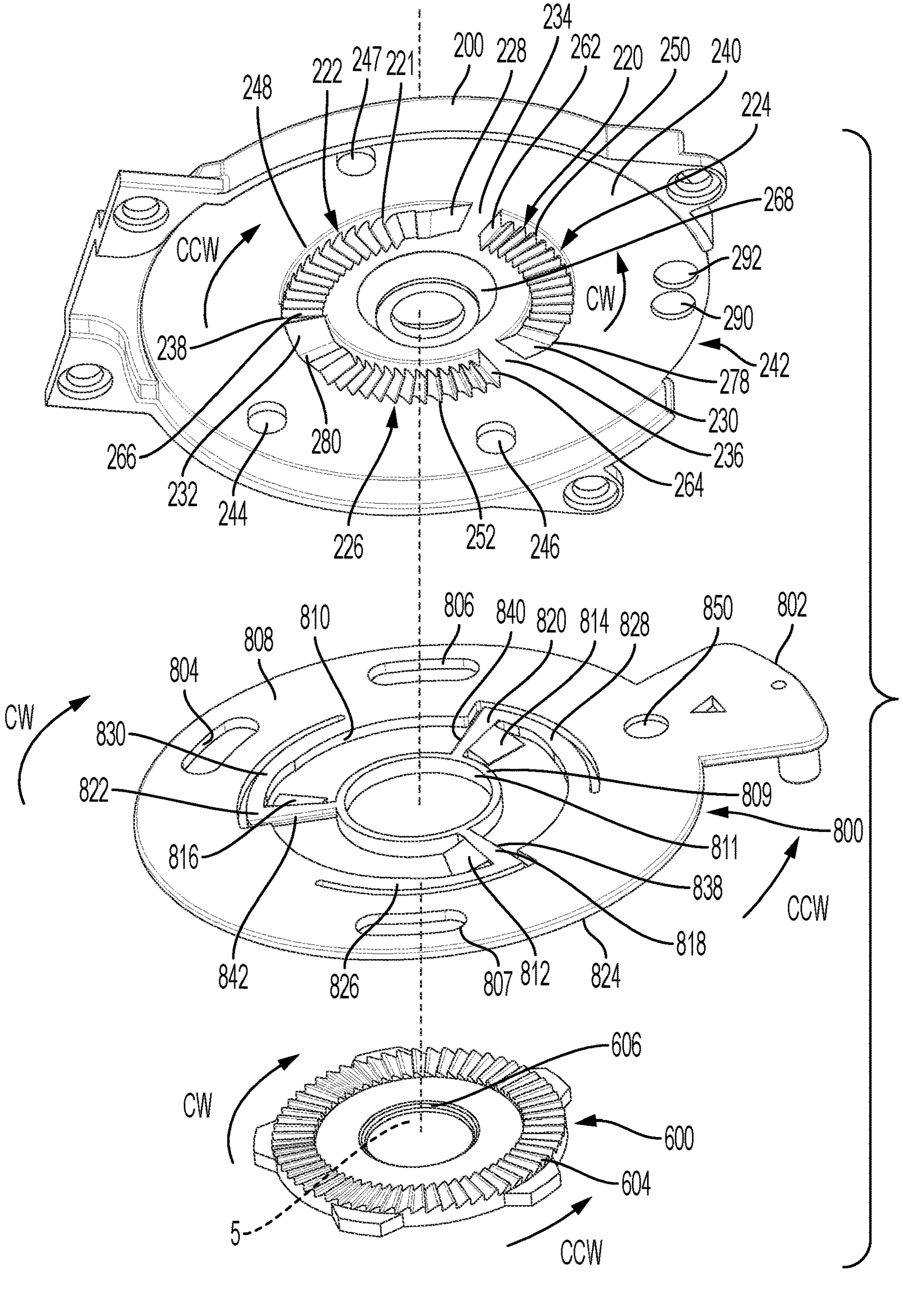
FIG. 4 is an exploded perspective view of the retractor module showing the top cover, the friction disc, and the driver in more detail; and, FIG. 5 is a cross-sectional view of the retractor module with the driver in an unlocked position.

Turning now primarily to FIG. 3, the retractor module 1 is exploded to reveal its component parts, which in various embodiments may comprise any one or more of bottom cover 100, top cover 200, spool (or drum) 300, restraint 400, rotational spring 500, friction spacer 720, bushing 740, driver 600, axial spring 700, friction disc 800, and bridge 900.

The top cover 200 and the bottom cover 100 which when combined define a frame with a chamber 60 for containing the spool 300. The top cover 200 and bottom cover 100 may be secured together via one or a plurality of fastening members, such as apertures or threaded holes 108, 110, 112, 114 on the bottom cover 100 which align with apertures 208, 210, 212, 214 on the top cover 200 for receiving fasteners 254, 256, 258, 260. The top cover 200 may additionally be secured to the bottom cover 100 via a fastener (e.g., a bolt) 50 inserted through centrally located aperture 216 and centrally located aperture or threaded hole 116. The fastener 50 helps resist internal stresses that would tend to push the top cover away from the bottom cover or permit the top wall of the top cover and/or the bottom wall of the bottom cover to flex or bow outward, thereby releasing or allowing slippage of the internal locking mechanism that is described in more detail below. In alternative embodiments, the apertures 208, 210, 212, 214, 216 may be threaded, as opposed to apertures 108, 110, 112, 114, 116, where fasteners 254, 256, 258, 260, 50 may be inserted from the underside of the retractor module 1. In yet other embodiments, none of the apertures 108, 110, 112, 114, 116, 208, 210, 212, 214, 216 will be threaded, and instead a nut will be utilized in combination with a threaded fastener.

One or both of the top cover 200 and bottom cover 100 may define a mouth or opening 118 where the free end 402 of the restraint 400 may leave the chamber 60 of the retractor portion 20. The mouth or opening 118 may have both a height $H_O$ and a width $W_O$ that are greater than the width $W_R$ of the restraint 400, which permits the restraint 400 to have any orientation (vertically, horizontally, or at an angle) as it extends through the opening 118. The sidewalls 106, 206 which define the opening 118 may have a contour or curvature as shown to guide the restraint 400 off of the spool 300 and through the opening 118.

The spool 300 may comprise a ring or annular portion 302 defining a peripheral outer surface 304 for spooling the restraint 400 and a core 306, which defines at least one open volume for receiving mechanical components. The spool 300 may, as shown, include a flange 308 extending inward from the inner surface of the ring 302. The flange 308 is substantially thinner that the thickness $T_S$ of the spool ring 302, whereby the flange 308 divides the core 306 into two open volumes: an upper core 312 and a lower core 314, which may, as shown, be interconnected via one or more holes (e.g., the central hub 316 described below). The flange 308 further includes a central hub 316 for receiving a spindle 120 that projects upward from the bottom wall of the bottom cover 100 and/or spindle 268 that projects downward from the top wall of the top cover 200. In this case, the spindle 120 is fixed and contains the centrally located threaded hole 116 described above. For the avoidance of doubt, in alternative embodiments, the spindle 120 can be integrated with and project downward from the top cover 200, rather than projecting upward from the bottom cover 100, and could rotate relative to the covers 100, 200. Tolerances in the respective diameters of the central hub 316 and spindles 120, 268 permit the spool 300 to rotate about the axis of the spindles 120, 268 relative to the bottom and top covers 100, 200, although the spindles 120, 268 could include bearings or reduced friction materials to facilitate smoother rotation of the spool 300.

Rotational spring 500 is disposed and engages between bottom cover 100 and the spool 300, in particular at least partially, substantially, or wholly inside the lower core 314 of the spool, to bias/torque the spool 300 in a clockwise direction CW (when viewed from above). In that regard, the spring 500 creates a retraction force on the restraint 400 that tends to pull the free end 402 of the restraint 400 back into the chamber 60 of the retractor portion 10. In this embodiment, the rotational spring 500 is a coiled metal tape having resilient properties, although other spring devices could be used to provide a retraction force, including but not limited to gas springs.

The restraint 400 may take the form of any material of sufficient strength for the anticipated loads in the application of concern, which may be securing a wheelchair and/or wheelchair occupant during transit in a vehicle. As shown, the restraint 400 takes the form of a webbing-type material. As shown, the restraint is rectangular or tape-shaped, with a width $W_R$ of approximately 19 mm or ¾ inches, a thickness $T_R$ of approximately 3 mm or 0.12 inches, and a length of approximately 187 cm or 75.5 inches, although those dimensions may be changed specific for the application of concern.

At its free end 402, the restraint 400 may include a connection member (or connector) for connecting to the object of concern (e.g., a wheelchair or a lap belt for a wheelchair occupant). As shown, the connection member takes the form of a hook 404, where the hook 404 has an eye 406 at its base for receiving the restraint 400. The eye 406 may include a bearing surface for minimizing friction and distributing forces on the restraint. As shown, the bearing surface comprises a round bar 408. To enable easy assembly and ensure a sufficiently strong connection between the restraint 400 and the hook 404, the distal end 403 of the restraint is inserted through a ring 410, doubled over itself for approximately 14 cm or 5.5 inches, and sewn together. Glue, welds, or other adhesive materials or techniques may be applied between the touching faces of or at the doubled-over portion of restraint 400 to strengthen the connection. The proximal end of the restraint can then be inserted first through the eye 406 of the hook 404, be inserted second through the opening of the ring 410, and then pulled tight to secure the restraint 400 to the hook 404. This connection configuration has been shown to be significantly stronger and more compact than simply inserting the restraint 400 through the eye 406 of the hook 404, and then doubling and sewing the restraint together (in a manner similar to how the ring 410 is secured to the restraint 400).

The restraint 400 may be secured to the spool 300 using any method. As contemplated, however, a dowel pin 418, one or more spring clips 420, and glue may be used. More specifically, the dowel pin 418 is inserted into a hoop formed at the proximal end of the restraint 400, whereafter the hoop 414 and dowel pin 418 are placed within a pocket 318 formed in the peripheral outer surface 304 of the spool 300. The restraint 400 may then be wound around the spool in a counterclockwise direction CCW. A spring clip 420, which as shown is generally C-shaped and engages with inwardly facing shoulders of the ring 302, is used to secure the first pass of the restraint 400 to the spool 300. For a more firm connection, additional clips 420, glue or other adhesive material or technique may be applied to the surface of the restraint 400 facing the peripheral outer surface 304 of the spool. For a stronger connection, the glue may be applied for at least one rotation around the spool 300, and more preferably at least 1.5 rotations (between 1-1.5 rotations, the second pass of the restraint is glued to the already spooled first pass). Further, the peripheral outer surface 304 may have a knurled or other surface roughness or friction inducing surface or surface coating to prevent slippage between the restraint 400 and the spool 300.

Notably, the ring 302 of the spool 300, and more particularly the peripheral outer surface 304 of the ring, may be snail-shaped when viewed from above, rather than perfectly circular. Considering the stacking nature of the restraint 400, and the doubled-over proximal end of the restraint 400, the snail shape allows the outside surface of the spooled restraint 400 to be more closely circular in shape (without bumps like prior art retractors, which bumps are usually present at the radial where the restraint attaches to the spool), which allows a smoother operation when the restraint 400 is pulled out by the user, or retracted by the coiled spring 500. More particularly, the radius of the ring 302 is the smallest adjacent to the connection point (pocket 318) with the restraint 400, and the radius increases around the perimeter of the ring 302 in the counterclockwise direction CCW to its largest adjacent to (on the opposite side of) the pocket 318

The driver (or ratchet) 600, axial spring 700, and bushing 740 at least partially, substantially, or wholly sit within the upper core 312 of the spool, wherein the upper core 312 is correspondingly shaped to the driver 600 and defines a vertical channel for translation of the driver 600 up and down. More particularly, the driver 600 is configured to move vertically (up and down) relative to the spool 300, but is radially engaged with the spool 300 so that the spool 300 and driver 600 are rotationally locked together—i.e., if one spins, the other must also spin. Any method or structure may be used to rotationally lock the driver 600 and spool 300 together. However, as shown, the driver 600 includes a series of radially extending engagement members or spurs 602 that sit within and engage with a series of corresponding pockets 322 defined by the core 312.

The axial spring 700 sits between the driver 600 and the bushing 740 (underneath the driver 600, and above the bushing 740) and serves to bias the driver 600 in an upward direction (or away from the driver 600). Notably, in prior art designs, the spring 700 was disposed directly between the driver 600 and the spool 300, which tended to push the spool 300 and restraint 400 against the bottom cover 100, increase the frictional forces between the spool 300/restraint 400 and bottom cover 100, and (thereby) reduce the retraction force that can be imparted upon the restraint 400 for any given coiled spring 500. The use of bushing 740 serves to isolate the spool 300/restraint 400 from the spring 700, thereby decreasing frictional forces between the spool 300/restraint 400 and bottom cover 100. More particularly, the bushing 740 is supported by one or both spindles 120, 268 and includes a base (or surface or shelf) 742 for engaging with spring 700 to transfer the force from the spring 700 away from the spool 300/restraint 400 and directly to one or both of the top cover 200 or bottom cover 100. As shown, the bushing 740 sits on top of the top surface of spindle 120 (which extends through the central hub 316 and sits above flange 308), and in that respect is spaced from or only lightly touching the top surface of the flange 308. The axial spring 700 engages between an underside of the driver 600 and an upper surface of the bushing 740, and urges the two away from each other. In other embodiments, the bushing 740 may be replaced by a washer that rests on one or both of the spindles 120, 268, or other shelf or bearing surface that is attached to or integrated into the top cover 200 or bottom cover (or spindles 120, 268 thereof). The bushing 740, the washer, or other comparable component or feature may equally serve as a spacer member for separating the spring 700 from the driver 600. The axial spring 700 may take any form, including the coiled metal wire as shown or gas springs.

To further reduce the frictional forces between the spool 300 and the bottom cover 100, and/or between the restraint 400 and the bottom cover 100, a friction spacer 720 may be disposed between the spool 100 and the bottom cover 100. The friction spacer 720 may take a sheet form, as shown, that is inserted on and lines the top surface of the bottom cover 100. In other embodiments, the friction spacer 720 may take the form of a lamination or other layer that is applied (for example, sprayed, glued, heat laminated, or any other method) to the top surface of the bottom cover 100. In any event, the friction coefficient of the friction spacer 720 is less than the friction coefficient of the top surface of the bottom cover 100. In one embodiment, the friction spacer 720 comprises a polyethylene, for example an ultra high molecular weight polyethylene.

In other embodiments, a similar friction layer can be used between any other moving parts of the retractor 1, for example surrounding spindle 120 and/or spindle 268, between bottom surface of the shelf 740 and top surface of spool 300, between the top surface of the shelf 740 and the spring 700, between the spring 700 and the driver 600, between the friction disk 800 and the spool 300, and between the friction disk 800 and the top cover 200.

The driver 600 may be, as shown, disc-shaped (or circular with a thin profile) and include a central hub 606 for rotational engagement with at least one of spindles 120, 268. The top surface of the driver 600 may include a series of (ratchet) teeth 604 designed to engage with a corresponding series of (pawl) teeth 220 located, as one example, on the underside 240 of the upper cover 200. As shown, the teeth 604 may extend upward from a top surface of the driver 600 in a direction generally parallel with the axis 5. Similarly, the teeth 220 may extend downward from the underside 240 of the cover 200, also in a direction generally parallel with the axis 5. Teeth 604, 220 may be distributed around the axis 5, for engagement with each other at multiple points distributed around axis 5. As configured, when the driver 600 is in its upwardly biased position, the generally or substantially vertical faces of teeth 604, 220 engage to prevent rotation of the driver 600, and thereby the spool 300, in a counterclockwise direction CCW. However, considering the correspondingly ramped faces of the teeth 604, 220, a rotational force on the spool 300 in a clockwise direction CW translates to the creation of a downward force on the driver by virtue of the ramped faces of the teeth 604, 200 sliding relative to each other, whereby the driver 600 will recess within the upper core 312 and compress the axial spring 700. Once the driver 600 is sufficiently recessed, tips of teeth 604 on the driver 600 will ride over tips of teeth 220 on the upper cover 200. In that respect, when the driver 600 is biased in its upper/normal position, restraint 400 may freely be retracted onto the spool 300 via the clockwise CW force exerted by rotational spring 500, but may not be withdrawn from the spool 300 by a pulling force exerted on the hook 404. However, when the driver 600 is depressed or held in a lowered position within the upper core 312 (via structures and methods described below), teeth 604 will be disengaged from the corresponding teeth 220 on the upper cover, whereby the spool 300 can freely rotate in both a counterclockwise direction CCW and a clockwise direction CW (i.e, the restraint 400 can be both pulled off of the spool 300 and retracted onto the spool 300). Obviously, the configuration of the teeth 604, 220 could be switched whereby engagement between the two would prevent rotation of the driver 600 and the spool 300 in a clockwise direction CW, but would permit rotation of the driver 600 and the spool 300 in a counterclockwise direction CCW.

The number, pitch, shape, angles, and pattern of teeth 604, 220 may be selected based on the type of application and required strength. As shown, sixty teeth 604 are arranged in a continuous circular pattern on the upper surface of the driver 600, while thirty-nine teeth 220 are arranged in a discontinuous circular pattern (three separate groups 222, 224, 226 of thirteen teeth 220) on the underside 240 of the upper cover 200. With this configuration, the number of teeth 604 define the resolution of the retractor (i.e., the length of restraint 400 that can be withdrawn or retracted as an individual tooth 604 jumps from one tooth 220 to the next), while the number of teeth 220 defines the strength of the engagement between driver 600 and the upper cover 200.

Notably, at least one group 222, 224, 226 of teeth 220 may include and end with a ramp 228, 230, 232 extending downward from the underside 240 of the top cover, and may reach a flat 276, 278, 280 at an elevation approximately equal with or greater than the elevation of the base 221 of each tooth 220 (where the ramp elevation slopes downward (away from the underside 240) in a clockwise CW direction, when viewed from above). Further, the ramps 228, 230, 232 may each be separated from the next group 222, 224, 226 of teeth (in a counterclockwise direction CCW) by a space or land 234, 236, 238. The purpose of the ramps 228, 230, 232, flats 276, 278, 280, and lands 234, 236, 238 will become apparent with reference to the discussion below.

In that regard, a clutch or friction disc 800 comprises a thin, disc-like structure, which may be formed from a plastic or metal or may be cut, stamped, or otherwise machined from another material plate, and may have resilient/spring-like properties. The friction disc 800 may be configured to lay flat adjacent to the underside 240 of the top cover 200, where a tab or trigger 802 may radially extend through a slot 242 in the top cover 200. As will be described in further detail, the trigger 802 can be rotated or moved along a circular path to rotate the friction disc 800 relative to the top cover 200 between an unlocked position and a locked position. The friction disc 800 may include a magnet or a ferromagnetic material (collectively referred to as a magnet member) 850 that is configured to magnetically engage with at least one magnet member disposed on one or both of the top cover 200 and bottom cover 100 to bias or hold the friction disc 800 in one or both of the unlocked position and the locked position. As shown, the top cover 200 includes two magnet members, a first magnet member 290 that magnetically engages with magnet member 850 to hold the friction disc 800 in the locked position and a second magnet member that magnetically engages with magnet member 850 to hold the friction disc in the unlocked position. In alternative embodiments, a spring interconnected between the trigger 802 and the retractor frame (e.g., covers 100, 200) (or other structure fixed relative to the retractor 1) may be used to bias the trigger 802 in the locked position. In either embodiment of the biasing member (magnet members 850, 290, 292 or the spring), the trigger 802 can be manipulated by hand between the locked and unlocked positions and/or using various mechanisms, such as cables, solenoids, hydraulic or pneumatic cylinders, linear actuators, etc. In the unlocked position, the friction disc 800 pushes the teeth 604 (and therefore the driver 600) downward and out of engagement with the teeth 220 on the underside 240 of the top cover 200. In the locked position, the friction disc 800 allows the axial spring 700 to push the driver 600 upward, whereby teeth 604 engage with teeth 220. The retractor actuator portion 30 of the retractor module 1 may include at least one and, as shown, two cradles 124,126 in the bottom cover 100 for holding an actuator or other mechanism that are configured to move the trigger 802 between the locked and unlocked positions.

The underside 240 of the top cover 200 and the friction disc 800 include at least one feature to limit the rotation of the friction disc 800 relative to the top cover 200 to between those two positions. Those limiting features may take any form, but in the shown embodiment the friction disc 800 includes a set of circularly oriented oval slots 804, 806, 807 that receive circular projections 244, 246, 247 that project downward from the underside 240 of the top cover 200, where the circular projections 244, 246, 247 act as stops to prevent further rotation at opposite ends of the oval slots 804, 806, 807. Additionally, each group 222, 224, 226 of teeth 220 may include a substantially vertical stop surface 262, 264, 266 that engage with a substantially vertical corresponding edge surface 838, 840, 842 when the friction disc 800 is at its fully locked position. Notably, the friction disc 800 also has an axial or ring portion 808 that defines a hub 810. That hub 810 rides on a spindle 282 defined by the outside edges 248, 250, 252 of the three groups 222, 224, 226 of teeth 220 on the underside 240 of the top cover 200. The friction disc 800 may also include a secondary, or inner ring portion 809 that defines a secondary, or inner hub 811 that rides on one or both of spindles 120, 268.

The friction disc 800 further includes features which engage with the ramps 228, 230, 232 and lands 234, 236, 238 to engage and disengage the teeth 604 on the driver 600 with the teeth 220 on the underside 240 of the top cover 200. For example, as shown, the friction disc 800 includes corresponding ramp structures 812, 814, 816 that correspond to ramps 228, 230, 232 located on the underside 240 of the top cover (each of which can also be characterized as cam surfaces or corresponding cam surfaces). Notably, when the friction disc 800 is in the locked position (rotated fully in the counterclockwise direction), the upper faces 818, 820, 822 of the corresponding ramp structures 812, 814, 816 sit within the lands 234, 236, 238. And because the thickness of the friction disc 800 is approximately equal to or less than the distance between the underside 240 of the top cover and the base 221 of the teeth 220, the friction disc 800 will not prevent engagement between teeth 604 and teeth 200. However, if the friction disc 800 is rotated in a clockwise direction CW relative to the top cover 200 to the unlocked position, engagement between the ramp structures 812, 814, 816 and the ramps 228, 230, 232 will push at least a portion of the friction disc 800 downward. In that respect, at least a portion of the underside 824 of the friction disc 800 will push the driver 600 downward such that teeth 604 on the driver 600 disengage from the teeth 220 on the top cover 200. As shown, the underside 824 of the friction disc 800 touches and pushes the teeth 604 downward when the friction disc 800 is rotated to the unlocked position, however the friction disc 800 could be configured to touch any other portion of the driver 600.

Notably, the friction disc 800 rotates from the locked position to the unlocked position in a clockwise direction CW, which is opposite the counterclockwise CCW unwinding direction of the spool 300 and restraint 400. In that respect, when the restraint 400 experiences a pulling load at the hook 404, in an accident for example, any friction that may exist between the spool 300 and/or restraint 400 on the one hand and the friction disc 800 on the other hand tends to urge the friction disc 800 to the locked position (rather than urging the friction disc 800 to a potentially unsafe unlocked position).

Figure 5:
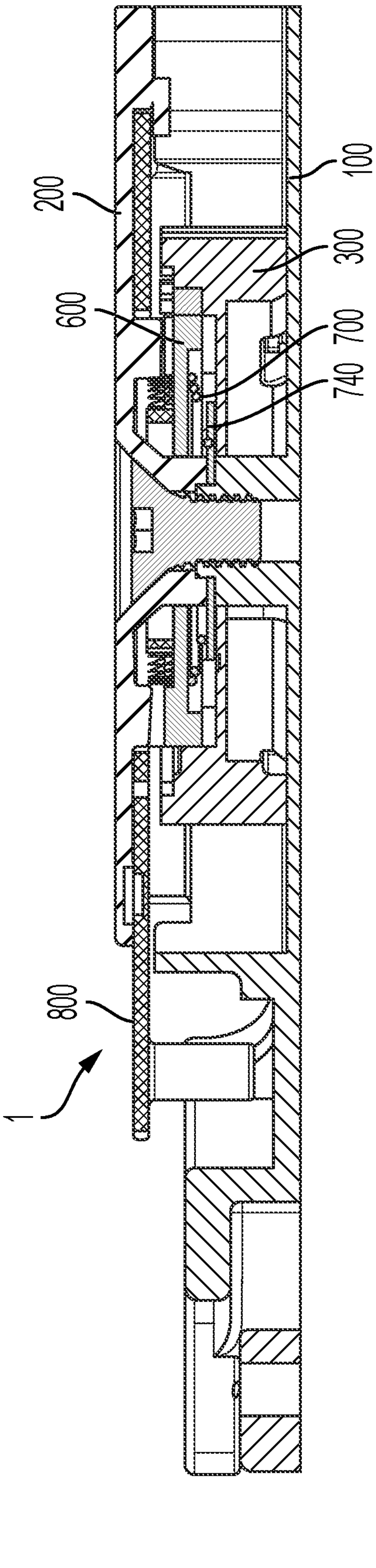

Moreover, and as best shown in FIG. 5, when the driver 600 is in the unlocked position, the axial spring 700 is not fully compressed to a flat condition. That is, when the driver 600 is in the unlocked position, the distance between the portion of the underside of the driver 600 that contacts the spring 700 and the portion of the shelf 740 that contacts the spring 700 is greater than the thickness of the spring 700 in its fully compressed condition. Preventing the spring 700 from fully compressing prevents the spring 700 from acting as a brake between the driver 600 and shelf 740.

As shown, it is contemplated that the friction disc 800 may have resilient or spring-like properties. In that regard, the ramp structures 812, 814, 816 may be present on structure (e.g., clutch members) that extend radially inward from and are connected to the hub 810 of the friction disc 800 via spring hinges 826, 828, 830 that allow the ramp structures 812, 814, 816 to flex downward out of plane with the ring portion 808 of the friction disc 800. In that respect, the undersides of the ramp structures 812, 814, 816 are the surfaces that engage with and push the driver 600 out of engagement with the teeth 220 on the underside 240 of the top cover 200. Notably, the ramp structures 812, 814, 816 may be tied together or interconnected via inner ring structure 809, to provide structural integrity to the ramp structure 812, 814, 816 and ensure that they move between their respective locked and unlocked positions concurrently.

While the rotational spring 500 and friction spacer 720 is shown and described as disposed in or below the lower core 314 of the spool 300 and engaged between the spool 300 and the lower cover 100, it is contemplated that the rotational spring 500 and friction spacer 720 in alternative embodiments may be disposed in or above the upper core 312 and engaged between the spool 300 and the upper cover 200. Similarly, while the axial spring 700, driver 600, and bushing/washer 740 are shown and described as disposed in the upper core 312, the groups 222, 224, 226 of teeth 220 are shown and described as disposed on the underside of the top cover 200, and the friction disc 800 is shown and described as disposed between the spool 300 and top cover 200, it is contemplated in alternative embodiments that the axial spring 700, driver 600, and bushing/washer may be disposed in the lower core 314, the groups 222, 224, 226 of teeth 220 may be disposed on the bottom cover 100, and the friction disc 800 may be disposed between the spool 300 and the bottom cover 100.

The retractor module 1 may be provided with a connecting member or bridge 900. The purpose of the bridge 900 may include one or more of directing the restraint 400 to a restraint guide 902, providing an anchor point 904 for the retractor module 1, and managing energy when the restraint 400 is subject to a load. As will be described below, when serving as the anchor point 904, the bridge 900 may be configured to absorb and manage large forces as they act on various components of the retractor module 1.

The bridge 900 may include a flange portion 906 at a first, or free end which is configured for receipt and securement with one or both of the top cover 200 and bottom cover 100. The bridge 900 may define a pathway or channel 912, through or across which the restraint 400 extends from the mouth 118 of the retractor portion 10 to the restraint guide 902. As shown, the channel 912 may be centrally positioned between two arms 914, 916 that merge at a second end where the restraint guide 902 and/or the anchor point 904 for the retractor module 1 may be disposed.

The restraint guide 902 may take any form for guiding the free end 402 of the restraint 400 in a desired orientation and/or direction. In this case, the restraint guide comprises a roller 918 which rotates about pin/bolt 920. Pin 920 in this case is aligned parallel to a transverse axis 7 of the retractor module 1, where the transverse axis 7 lies in a horizontal plane and is transverse to both vertical axis 5 of the spool 300 and longitudinal axis 9 of the retractor module 1. Note that it may be desirable to give pin 920 an axis that is at an angle relative to transverse axis 7, e.g., tilted at an angle either or both within a horizontal plane and a vertical plane, for example by rotating the pin 920 about an axis parallel with spool axis 5 and/or rotating the pin 920 about an axis parallel with longitudinal axis 9.

When the alignment of pin 920 is transverse to spool 300 as shown, roller 918 therefore serves to change the orientation of the restraint 400 as it leaves spool 300. More particularly, the width WR of the restraint 40 (referred to herein as a restraint lateral axis) is aligned vertically (or parallel to spool axis 5) when it is spooled on spool 300 and is aligned horizontally (or parallel to transverse axis 7) as it passes by the roller 918. In that respect, the restraint 400 may include a twisted region 424 between the spool 300 and roller 918 wherein the restraint 400 twists approximately 90°. In other embodiments, where the pin 920 is at an angle relative to the transverse axis 7 as described above, the twist angle may be any angle greater than 0° and up to 90°, including but not limited to approximately 15° or greater, approximately 30° or greater, approximately 45° or greater, approximately 60° or greater, approximately 75° or greater, approximately 80° or greater, approximately 85° or greater, any angle between therebetween.

The roller 918 further serves to redirect the free end 402 of the restraint. In a typical installation where four restraint modules 1 are floor installed and used to secure a wheelchair at all four corners, the restraint 400 for each restraint module 1 will be oriented roughly horizontally as it extends from the spool 300 to the roller 918, and the free end 402 of the restraint 400 will be oriented at an angle of roughly 30-60° relative to horizontal as it extends from the roller 918 to the wheelchair attachment point, more preferably approximately 30-45° for rear wheelchair tiedowns and approximately 40-60° for front wheelchair tiedowns. Ideally, to save space in the vehicle, it would be desired to orient the restraint modules 1 where the spools 300 are more centrally located relative to the wheelchair and the restraint guides 902 are oriented toward either the front end or rear end of the wheelchair. In that respect, the roller 918 serves to redirects the webbing by a redirect angle RA that will exceed 90°, more particularly approximately 120-150° to achieve the 30-60° orientation described above, approximately 135-150° to achieve the 30-45° orientation described above for rear wheelchair tiedowns, and approximately 120-135° to achieve the 40-60° orientation described above for front wheelchair tiedowns.

The restraint module may be configured to be anchored to a surface using a single bolt 922 inserted though an aperture at the anchor point 904 at the end of the bridge 900 distal to the retractor portion 10. In that respect, the retractor portion 10 is configured to "float" at the end of the bridge 900, where the bridge 900 may be characterized as a column in the structural sense. More particularly, when the retractor portion 10 is locked (i.e., restraint 400 cannot be withdrawn from the spool 300) and the restraint 400 is under tension (e.g., during a vehicle accident), the bridge 900 experiences a compressive column load of roughly equal value.

In any version of any embodiment described herein, the restraint may take any form, such as webbing, belt, cable, chain, rope, string, etc. The guide members may also take any form, such as a roller, a pin, a contoured surface, an aperture, etc. Likewise, the connector may take any form, such as a hook, a clip, a buckle, a tongue, etc.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

The invention claimed is:

1. A retractor comprising a housing, a drum, a restraint, a first locking member, a second locking member, and a spring, wherein:
- the drum spools the restraint, has a rotational axis, and is biased to retract the restraint;
- the first locking member is rotationally locked with the drum about the rotational axis and is moveable transverse to the rotational axis between a locked position and an unlocked position;
- in the locked position, the first locking member engages with the second locking member to prevent rotation of the drum in at least one direction about the rotational axis; and,
- the spring exerts a force to urge the first locking member to the locked position, whereby the drum is isolated from the force.

2. The retractor of claim 1, wherein: the drum comprises a ring portion that surrounds a core; and the first locking member and the spring are at least partially disposed in the core.

3. The retractor of claim 1 further comprising a base supported by the housing, wherein the spring engages between the base and the first locking member to urge the first locking member to the locked position.

4. The retractor of claim 3, wherein: the drum includes a hub; the housing includes a spindle extending at least partially through the hub; and the base is supported by the spindle.

5. The retractor of claim 3, wherein the base is a bushing.

6. The retractor of claim 3, wherein the base is a washer.

7. The retractor of claim 3, wherein the base is a shelf.

8. The retractor of claim 1, wherein the spring is not fully compressed when the first locking member is in the unlocked position.

9. The retractor of claim 2, wherein the base is disposed in the core.

10. The retractor of any claim 1 further comprising a friction spacer, wherein the friction spacer is disposed between a portion of the drum and a portion of the housing.

11. The retractor of claim 10, wherein a friction coefficient of the friction spacer is less than a friction coefficient of the portion of the housing.

12. The retractor of claim 10, wherein the friction spacer is comprised of polyethylene.

13. The retractor of claim 10, wherein the friction spacer is comprised of ultra high molecular weight polyethylene.

14. The retractor of claim 10, wherein a weight of the drum urges the drum against the friction spacer.

15. The retractor of claim 10 wherein the friction spacer is disposed between a portion of the restraint and the portion of the housing.

16. The retractor of claim 15 wherein a combined weight of the drum and the restraint urges the drum and the restraint against the friction spacer.

17. The retractor of claim 10 wherein the portion of the housing is a top surface of a bottom cover.

18. The retractor of claim 10 wherein the friction spacer is a sheet.

19. The retractor of claim 10 wherein the friction spacer is laminated on one of the drum and the housing.

20. The retractor of claim 10 wherein the friction spacer is adhered to one of the drum and the housing.

* * * * *